US006647051B1

United States Patent
Greenhoe

(10) Patent No.: US 6,647,051 B1
(45) Date of Patent: Nov. 11, 2003

(54) ZERO DELAY MASK FOR GALOIS LFSR

(75) Inventor: Daniel J. Greenhoe, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/474,303

(22) Filed: Dec. 29, 1999

(51) Int. Cl.$^7$ ................................................. H04B 1/69
(52) U.S. Cl. ........................................ 375/130; 714/739
(58) Field of Search ..................... 375/141, 146, 375/140, 130, 265, 341, 372, 377; 708/250, 252, 251, 253; 714/728, 731, 739, 781; 377/26

(56) References Cited

U.S. PATENT DOCUMENTS

| | | | | |
|---|---|---|---|---|
| 5,163,070 A | | 11/1992 | Bielby et al. ................. 375/115 |
| 5,373,291 A | | 12/1994 | Simpson ....................... 341/87 |
| 5,528,607 A | * | 6/1996 | Weng et al. ................... 714/775 |
| 5,574,673 A | | 11/1996 | Lowy ............................ 364/717 |
| 5,631,913 A | * | 5/1997 | Maeda ......................... 714/732 |
| 5,754,603 A | | 5/1998 | Thomas et al. .............. 375/367 |
| 5,754,604 A | | 5/1998 | Li et al. ....................... 375/367 |
| 5,878,076 A | | 3/1999 | Siedenburg ................. 375/206 |
| 5,926,070 A | | 7/1999 | Barron et al. ................. 331/78 |
| 5,929,793 A | | 7/1999 | Choi ............................ 341/67 |
| 5,987,056 A | * | 11/1999 | Banister ....................... 375/130 |
| 6,061,417 A | * | 5/2000 | Kelem ......................... 377/26 |
| 6,192,385 B1 | * | 2/2001 | Shimada ...................... 708/250 |
| 6,339,781 B1 | * | 1/2002 | Sasaki ......................... 708/252 |
| 6,353,842 B1 | * | 3/2002 | Rajski et al. ................. 708/252 |
| 6,459,722 B2 | * | 10/2002 | Sriram et al. ................ 375/130 |
| 6,467,063 B1 | * | 10/2002 | Fukuoka ...................... 714/784 |

FOREIGN PATENT DOCUMENTS

| | | | | |
|---|---|---|---|---|
| EP | 0456975 A2 | 11/1991 | .......... H03M/13/00 |
| EP | 0577330 A2 | 1/1994 | ............ H04M/7/40 |
| WO | WO9935564 | 7/1999 | ............. G06F/7/58 |
| WO | WO9945670 | 9/1999 | ............ H04K/1/02 |

* cited by examiner

*Primary Examiner*—Emmanuel Bayard
(74) *Attorney, Agent, or Firm*—Michael E. Belk

(57) ABSTRACT

A method and apparatus for the creation and use of a recursive system that generates an output that depends upon a plurality of previous outputs by first processing previous outputs to obtain processed values, storing the processed values, determining new outputs depending on the processed values by providing a connection to stored processed values, the connection being operative to connect the stored processed values to a series of switches and adders that reverse process the processed values.

15 Claims, 3 Drawing Sheets

ZERO DELAY MASK FOR GALOIS LFSR

FIELD OF THE INVENTION

The invention is related to the field of direct-sequence spread spectrum communication systems such as those implementing the CDMA-2000, UMTS, IS-95 standards and similar cellular telephone systems which apply a pseudo-noise sequence for encoding and decoding data.

BACKGROUND OF THE INVENTION

Spread spectrum communication systems are finding increased use in two-way aerial communication. Just as AM and FM systems use a sinusoidal signal to carry information, spread spectrum systems use a noise-like signal to carry information. In a transmitter, a stream of digital data is encoded with a pseudo-noise sequence (PNS) to spread the spectrum of the signal for transmitting the data through a media. At a receiver the data is recovered from the media and then decoded using the same PNS to de-spread the spectrum of the signal to reproduce the original digital data stream.

A PNS is a stream of bits with a pattern that is determinate, but which appears to be a random bit stream. A common apparatus for producing a PNS is a linear feedback shift register (LFSR). Two common types of LFSRs are Fibonacci LFSRs and Galois LFSRs. Both types include a closed loop circuit containing bit registers and modulo-2 adders through which bits are shifted through the loop. The adders have one input that is part of the loop and another input that is connected to another part of the loop to form multiple loops to randomize the bits as they are shifted through the loop.

The values of the PNS for any LFSR, repeat after a large number of bits and it is desirable to provide a PNS with the longest possible sequence without repeating using a limited amount of hardware. This is accomplished by choosing the configuration of the adders and registers of the LFSR and the initial values of the registers in a manner well known in the art. For a given number of registers m contained in the LFSR, the longest possible non-repeating portion of the PNS is equal in length to $2^m-1$ bits.

In addition to using the same PNS, the transmitter and receiver must use values from the same position in the PNS for spreading and de-spreading respectively. In order to synchronize the transmitter and receiver to both use values at the same position in the PNS, an offset mask value is calculated and combined with the output values of the current position of the PNS (in the transmitter or receiver) to produce the values of a different shifted position in the PNS in a manner well known in the art.

Those skilled in the art are directed to the following citations. U.S. Pat. No. 5,878,076 to Siedenburg describes a direct sequence spread spectrum communication system. U.S. Pat. No. 5,754,603 to Thomas describes PNS synchronization. U.S. Pat. No. 5,926,070 to Barron describes offset mask generation. European patent application publication 0 660 541 by Ishida describes methods of synchronizing PNS positions of a transmitter and receiver. PCT patent application publication WO 99/45670 by Medlock describes masks for LFSRs.

FIG. 1 describes selected portions of a Galois LFSR with an offset mask. LFSR 100 includes a multitude of binary registers 101–108 connected in series in a loop circuit. The binary registers may be D-flip-flops or other know bit storage devices. Using register 102 as an example, each register 102 has a value input 110 connected to an output 111 of a previous register 101 and each register 102 has an output 112 connected to the value input 113 of a subsequent register 103.

LFSR 100 also includes one or more modulo-2 adders 115–117 connected in the loop circuit. Each adder is inserted between a different pair of sequential registers 101–108 of the register series. The selection of the pairs of registers between which adders are inserted, depends on the selection of a primitive binary polynomial. A primitive polynomial is similar in concept to a prime number. A primitive polynomial is a polynomial that can not be divided by any simpler polynomial. For the specific example LFSR shown in FIG. 1, the primitive binary polynomial is $D^8+D^4+D^3+D^2+1$. The $D^8$ requires the LFSR to have 8 registers, and the $D^2$, $D^3$ and $D^4$ terms require adders be inserted between the second to the last, third from the last, and fourth from the last pairs of registers as shown. Primitive polynomials, like prime numbers, are well known in the art.

The inserted adders 115–117 each have two inputs and one output and may be simply implemented as XOR gates. As an example, adder 115 has first input 120 connected to output 121 of previous register 104 and output 122 connected to value input 123 of subsequent register 105. Also, adder 115 has second input 124 connected between output 125 of last register 108 and input 126 of first register 101 of the register series. Clock signal line 130 is connected to a clock input of each register of the register series, and when a clock signal is transmitted through the clock signal line, each register begins to output the value being received at that time at the register's value input. For example, clock signal line 130 is connected to clock input 131 of register 101.

Control lines 135 includes at least one initialization line 136 connected to each register 101–108 in order to initialize the values of the registers. For example, initialization line 136 is shown connected to initialization input 137 of register 108. The initialization line may write a memory value into the register so that any initial value can be written into any register as desired. In that case, the initial values of the registers are usually predetermined and stored in a memory. Alternatively, the control line may simply signal the register to assume some predetermined initial value that is built into the hardware of the particular register. If the registers are D-flip-flops the initialization line is connected to the set input of every register to be initialized to one and connected to the reset input of every register to be initialized to zero, and when the initialization line goes high, the values of the registers assume their respective initial values. Methods for selecting the initial values of the registers for a particular primitive polynomial are well known and further discussion is not required herein.

The Galois LFSR shown in FIG. 1 outputs bit values for the PNS at output 138. However, in order for a receiver to synchronize the position of the output values in the PNS with the position of output values for a transmitter using the same PNS (or vice versa), offset mask values must be combined with a previously output portion of the PNS.

Mask 140 is connected with output 138 of Galois LFSR 100 as shown in FIG. 1. The mask includes a series of registers 141–148 which respectively store the previous 8 values of the PNS output from the LFSR. The outputs of registers 142–148 are connected to the inputs of respective subsequent registers 141–147. For example, input 149 of register 146 is connected to output 150 of register 147, and output 151 of register 146 is connected to the input 152 of register 145.

The mask also includes a series of modulo-2 adders 161–167 with a first input of each subsequent adder 162–167 connected to an output of a previous respective adder 161–166 in the adder series. For example, input 153 of adder 165 is connected to output 154 of adder 164 and output 155 of adder 165 is connected to input 156 of adder 166. A multitude of mask switches 171–178 include a first mask switch 171 with an output 179 connected to a first input 180 of first adder 161 of the adder series. Also, subsequent mask switches 172–178 have outputs connected to respective second inputs of adders 161–167 in the adder series. The output of each register 141–148 is connected to the input of respective switches 171–178.

Mask value lines 191–198 of control lines 135 are connected respectively to switches 171–178, in order to set respective switches 171–178 in an open or closed position which controls whether the value of a respective register is provided through the respective switch to a respective input of a respective adder of adders 161–167. For example, output 151 of register 146 is connected to input 182 of switch 175 and output 183 of switch 175 is connected to input 184 of adder 165. Thus, when switch line 196 is set to 1, then the value of register 146 is modulo-2 added with the output value of output 154 of adder 164 and the result is output at output 155 to input 156 of adder 166. Otherwise, when switch line 183 is set to 0, then the output value from output 154 of adder 164 simply passed through adder 165 to input 156 of adder 166. Finally, output terminal 199, connected to the output of last modulo-2 adder 167 in the adder series, outputs the value of the masked PNS.

Microcontroller 200 includes a processor 201, clock 202, and memory 203 interconnected by a bus 204. A power supply 205 provides power to operate the processor, memory and clock. The clock provides timing signals to the processor and memory to synchronize operations. The memory of the microcontroller contains a data module 206 containing the initial values for registers 101–108 and program module 207 to control the processor to transfer those initial values through control lines 135 to those registers at initialization. The memory also includes program module 208 to calculate the mask values in a manner well known in the art, so as to synchronize the respective values provided by the masked PNS of a transmitter and receiver.

In known masked Galois LFSRs, after the LFSR is initialized the mask of the LFSR outputs an invalid sequence until bits of the correct PNS are loaded into all the registers of the mask. This is especially a problem in systems which initialize the LFSR to different initial values during synchronization between transmitters and receivers.

The above citations are hereby incorporated herein in whole by reference.

SUMMARY OF THE INVENTION

In the invention of applicants, a masked Galois linear feedback shift register (LFSR) is able to output a correct masked pseudo-noise sequence (PNS) immediately upon initialization of the LFSR. This is accomplished by interconnecting mask switches of a Galois LFSR through a combinatorial network with the registers of the LFSR. The invention also provides a simple method for determining how to interconnect the switches with the registers depending only on the LFSR which in turn depends on the specific primitive polynomial that the Galois LFSR implements.

Those skilled in the art will understand the invention and additional objects and advantages of the invention by studying the description of preferred embodiments below with reference to the following drawings that illustrate the features of the appended claims:

DETAILED DESCRIPTION OF THE PREFERRED EMBODIMENTS

Figure 1:
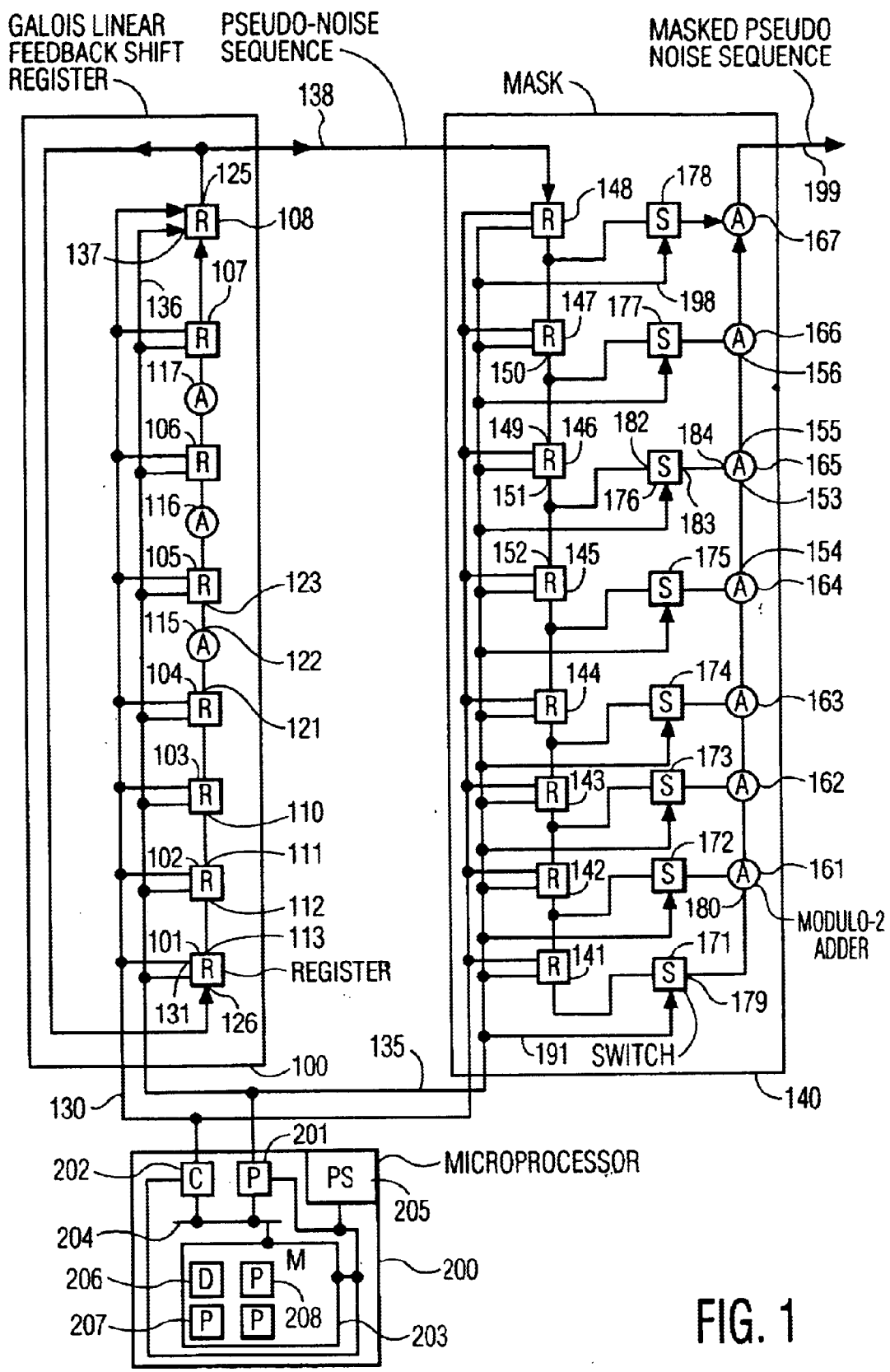
FIG. 1 illustrates typical features of previous masked Galois linear feedback shift registers (LFSRs).

In the drawings, similar components in different drawings have the same labels in order to simplify description.

Figure 2:
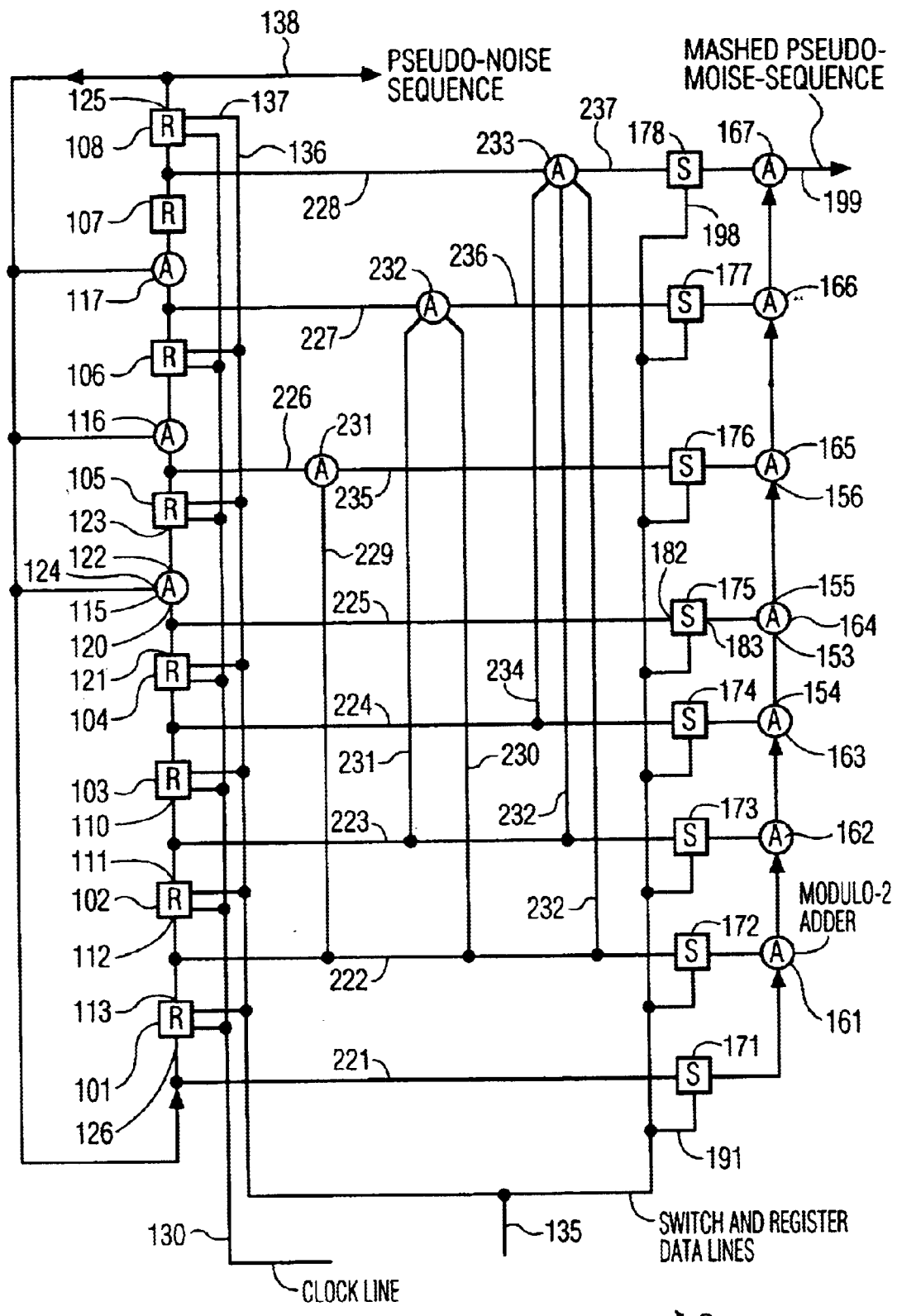
FIG. 2 shows an LFSR of the invention.

FIG. 2 illustrates a masked Galois linear feedback shift register (LFSR) 220 of the invention. The components and operation of the LFSR including registers 101–108 and adders 115–117 are the same as in FIG. 1 described above. Also in the mask, the series of adders 161–167 and the switches 171–178 connected to respective inputs of the adders of the adder series are essentially the same as in FIG. 1.

In the masked LFSR of in FIG. 2, a respective network is connected between the outputs of one or more of registers 101–108 and the input of each of mask switches 171–178. The networks include, one-to-one connections 221, 222, 223, 224 and 225 between the outputs of registers 125, 101, 102, 103 and 104 and the inputs of respective mask switches 171, 172, 173, 174 and 175. The networks include, connections 229 and 226 between the outputs of registers 101 and 105 and inputs of modulo-2 adder 231 and connection 235 between the output of modulo-2 adder 231 and the input of mask switch 165. The networks include, connections 230, 231 and 227 between the outputs of registers 101, 102 and 106 and inputs of modulo-2 adder 232 and connection 236 between the output of modulo-2 adder 232 and the input of mask switch 166. The networks also include, connections 232, 233, 234 and 228 between the outputs of registers 101, 102, 103 and 107 and inputs of modulo-2 adder 233 and connection 237 between the output of modulo-2 adder 233 and the input of mask switch 167.

The configurations of the networks between the registers and the switches can be determined directly from the configuration of the Galois LFSR. In this case, because the Galois LFSR has adders connected to the outputs of the 4th, 5th and 6th registers, then connections should extend from the outputs of the registers across 4, 5 and 6 registers to the switches, where that can be done. Only connections 229, 231 and 232 can extend from register outputs across 4 registers to a respective switch. Only connections 230 and 233 can extend across 5 registers to a respective switch. Only connector 232 can extend across 6 registers to a switch. Preferably, the number of connections is minimized by choosing a primitive polynomial that, except for the first term, has only a few lower order terms. That is, if the polynomial had a $D^7$ term then an adder would have been inserted between registers 101 and 102 and connections would have been provided extending across 1 register, where that could be done, so that adders would have been required for switches 173, 174 and 175 and 6 more connections would have been required from registers 101, 102, 103, 104, 105 and 106 to adders for switches 173, 174, 175, 176, 177 and 178 respectively.

Figure 3:
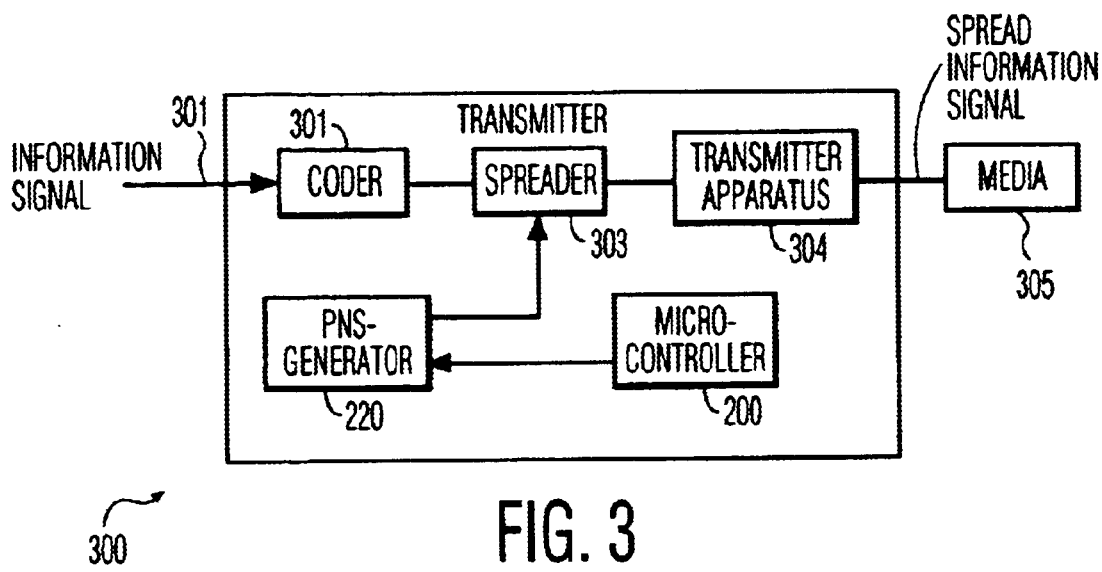
FIG. 3 illustrates a transmitter using the LFSR of FIG. 2.

FIG. 3 illustrates a transmitter 300 of the invention which utilizes the masked Galois LSFR 220 of FIG. 2. Microcontroller 200 is connected to provide clock, register initialization, and mask signals to masked Galois LSFR 220 as described above in relation to FIG. 2. An information signal is received through an input 301 into coder 302 which converts the information into a serial bit stream. For example, the coder may convert analog voice input into a bit stream. If the information received through the input is already a serial bit stream then the coder may not be required. The bit stream is spread by spreader 303 depending on the PNS output of the masked Galois LFSR 220 of the invention, in order to provide a spread information signal. Transmitter apparatus 304 transmits the spread information signal into media 205. The transmitter may be, for example, a modulator connected to an antenna for broadcasting the spread information signal through the airways; a channel encoder connected to a write head of a media drive for writing the spread information signal onto computer media; or a laser connected to transmit through an optical fiber or any other similar information transmission system.

Figure 4:
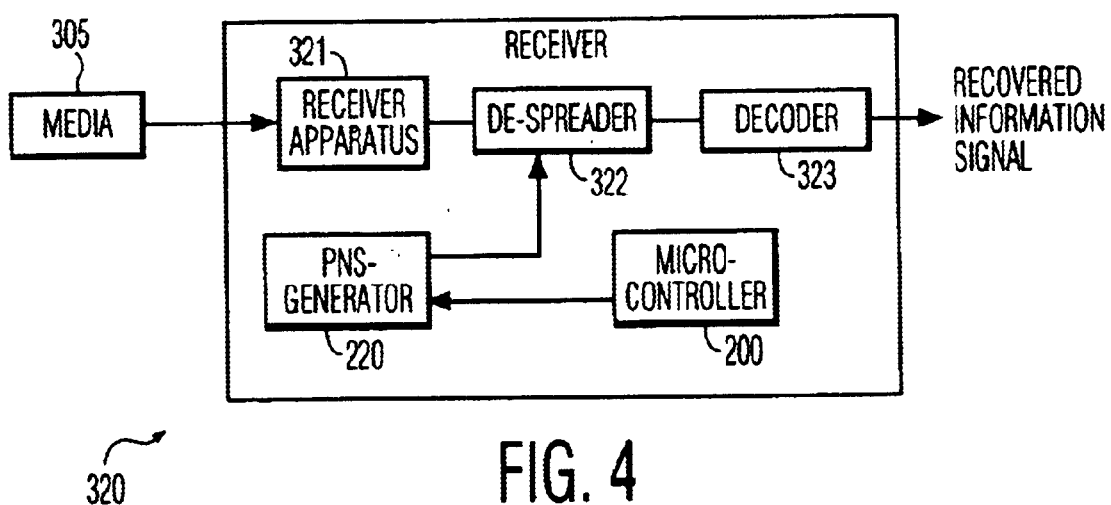
FIG. 4 shows a receiver using the LFSR of FIG. 2.

FIG. 4 shows a receiver 320 for receiving the spread information signal produced by the transmitter of FIG. 3 and reproducing the information signal originally input into the transmitter. Receiving apparatus 321 receives the spread information signal from media 305. The nature of the receiver depends on the media as discussed above. De-spreader 322 de-spreads the spread information to provide the coded bit stream described above. Decoder 323 decodes the coded bit stream to reproduce the information signal that was originally received by transmitter 300. If a coder was not required then a decoder may not be required depending on the circumstances. PNS-generator 220 is identical to PNS-generator 220 of FIG. 3 and preferably is the masked Galois LFSR 220 of FIG. 2. In PNS-generator 220 the output values of a pseudo-noise sequence (PNS) has been modified by a mask of the invention to to provide output values corresponding to a different position in the PNS sequence so that the same values can be used for spreading the information signal and for de-spreading the spread information signal.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

I claim:

1. A recursive system, with an output that depends on a plurality of previous outputs:
    first means for processing a series of previous outputs to obtain a set of processed values;
    means for storing the set of processed values;
    means for determining new outputs depending on the set of processed values having a connection to the means for storing, the connection further comprising an operative connection between the means for storing and at least one adder; and
    means for reverse processing the set of processed values to obtain the series of previous outputs the means for reverse processing further comprising the output of the adder being supplied to at least one switch.

2. The system of claim 1, in which:
    the system further comprises means to initialize the stored processed values at least at system start-up;
    the system further comprises means for further processing the processed values to obtain a plurality of further processed values, the new outputs depending on both the processed values and the further processed values, the reverse processing including reverse processing both processed values and the further processed values to obtain the original value of respective outputs;
    the first means for processing include a microcomputer having a processor, a memory and a clock interconnected by a bus and attached to a power supply, the memory containing a computer program;
    the storing means are selected from registers, a D-flipflop, a word memory;
    the determining means includes the microcomputer of the first processing means for performing the determining or another microcomputer for performing the determining, and the microcomputer for performing the determining includes a computer program for determining the new outputs depending on the processed values;
    the reverse processing means may also include the microcomputer of the first processing means or another microcomputer for processing in which the memory also includes a computer program for reverse processing the processed values to obtain the original outputs;
    the reverse processing is performed immediately in a single operation; and
    the system further comprises: means for processing the original outputs to obtain a different output.

3. The recursive system, as defined by claim 1 wherein the means for determining further comprises the connection having at least one network connection wherein the network connection is supplied to the adder input as well as to an input of a different one of the at least one switches.

4. The recursive system, as defined by claim 3 wherein the means for reverse processing further comprises each of the at least one switches having an output into a different one of a plurality of adders.

5. The recursive system, as defined by claim 4 wherein the means for reverse processing further comprises a value input to select a value of each of the switches.

6. The method of operating a recursive system, as defined by claim 5 wherein the step for determining new outputs further comprises placing the connection having at least one network connection wherein the network connection is supplied to the adder input as well as to an input of a different one of the at least one switches.

7. The method of operating a recursive system, as defined by claim 6 wherein the step of reverse processing the processed values further comprises placing outputs from each of the at least one switches into an input for a subsequent one of a plurality of adders.

8. The method of operating a recursive system, as defined by claim 7 wherein the step of reverse processing the processed values further comprises placing outputs from each of the at least one switches into an input for a subsequent one of a plurality of adders.

9. The method of operating a recursive system, as defined by claim 8 wherein the step of reverse processing the processed values further comprises placing a value input to select a value of each of the switches.

10. A masked Galois linear feedback shift register, comprising:

a series of binary registers in a circuit loop with a value input of each subsequent register connected to an output of a previous register in the loop;

one or more modulo-2 adders inserted between pairs of adjacent registers in the connections between the outputs of previous registers and respective value inputs of subsequent registers of the register series, each adder having a first input connected to the previous respective register and an output connected to the subsequent respective register of the register pair, and each adder having a second input connected to the output of a last register and to the input of a first register of the register series to form the loop;

a clock signal line connected to a clock input of each register of the register series so that when a clock signal is transmitted through the clock signal line, each register begins to output a value being received at that time at the register's value input and continues to output that value regardless of any subsequent change in the input value until the next clock signal;

means for initializing the value of each register to provide an initial value at least at the start-up of the Galois linear feedback shift register;

a series of modulo-2 adders with a first input of each subsequent adder in the adder series connected to an output of a previous adder in the adder series;

a multitude of mask switches including a first mask switch with an output connected to a first input of a first adder of the adder series and subsequent mask switches with outputs connected to respective second inputs of adders in the adder series;

an mask value input line for each mask switch to set the value of the mask switches depending on a selected mask value;

connection networks between the inputs or outputs of the registers and each respective mask switch, each network selected from: a connection between the input or output of the register and the input of the respective mask switch; and connections between the inputs or outputs of multiple registers and the inputs of a modulo-2 adder and a connection between the output of the adder and the respective mask switch; and an output terminal connected to the output of a last modulo-2 adder in the adder series.

11. The masked Galois linear feedback shift register of claim 10, in which:

the initializing means is selected from: selecting registers with predetermined initial values; selectively connecting either set and reset lines to D-flip-flops; providing data lines to each register for setting the initial value to any computed value;

the modulo-2 adders are XOR gates;

the registers are D-flip-flops;

the coefficients of a primitive polynomial determine: which pairs of registers have modulo-2 adders between them, and the networks between the registers; and the coefficients of the primitive matrix also determine the initial values of the registers.

12. A transmitter comprising:

an input for an information signal;

a power supply;

a microcontroller connected to the power supply;

a loop series of binary registers with a value input of each subsequent register connected to an output of a previous register;

one or more modulo-2 adders selectively connected between respective pairs of subsequent registers of the register series, each adder having a first input connected to a previous register and an output connected to a subsequent register of the register pair and having a second input connected between a last register and a first register of the register series;

a clock signal line connected to a clock input of each register of the register series so that when a clock signal is transmitted through the clock signal line each of the registers begins to output a value being received at that time at the register's value input;

means for initializing the value of each register to provide an initial value at the start-up of a Galois linear feedback shift register;

a series of modulo-2 adders with a first input of each subsequent adder in the adder series connected to an output of a previous adder in the adder series;

a multitude of mask switches including a first mask switch with an output connected to a first input of a first adder of the adder series and subsequent mask switches with outputs connected to respective second inputs of adders in the adder series;

a respective mask value input line for each mask switch to set the value of the mask switches depending on mask value automatically selected by the microcontroller;

connection networks between the inputs or outputs of the registers and each respective mask switch, each network selected from: a connection between the input or output of the register and the input of the respective mask switch; and connections between the inputs or outputs of multiple registers and the inputs of a modulo-2 adder and a connection between the output of the adder and the respective mask switch;

a spreader to spread the information signal depending on the output of a last modulo-2 adder of the adder series; and transmitter apparatus for transmitting the spread information signal into a medium.

13. The transmitter of claim 12, in which:

the medium is selected from: computer media in a media drive of the transmitter, a broadband network connected to the transmitter, and an antenna together with an open space through which radio waves travel; and the microcontroller includes a processor, a memory, and a clock interconnected by a bus.

14. A transmitter comprising:

receiver means for receiving a spread information signal from a medium;

a power supply;

a microcontroller connected to the power supply;

a loop series of binary registers with a value input of each subsequent register connected to an output of a previous register;

one or more modulo-2 adders selectively connected between respective pairs of subsequent registers of the register series, each adder having a first input connected to a previous register and an output connected to a subsequent register of the register pair and having a second input connected between a last register and a first register of the register series;

a clock signal line connected to a clock input of each register of the register series so that when a clock signal is transmitted through the clock signal line each of the registers begins to output a value being received at that time at the register's value input;

means for initializing the value of each register to provide an initial value at the start-up of a Galois linear feedback shift register;

a series of modulo-2 adders with a first input of each subsequent adder in the adder series connected to an output of a previous adder in the adder series;

a multitude of mask switches including a first mask switch with an output connected to a first input of a first adder of the adder series and subsequent mask switches with outputs connected to respective second inputs of adders in the adder series;

an mask value input line for each mask switch to set the value of the mask switches depending on mask value automatically selected by the microcontroller;

connection networks between the inputs or outputs of the registers and each respective mask switch, each network selected from: a connection between the input or output of the register and the input of the respective mask switch; and connections between the inputs or outputs of multiple registers and the inputs of a modulo-2 adder and a connection between the output of the adder and the respective mask switch;

a de-spreader to de-spread the spread information signal depending on the output of a last modulo-2 adder of the adder series to produce a recovered information signal; and an output for the recovered information signal.

15. A method of operating a recursive system, with an output depending on a plurality of previous outputs:

processing a plurality of previous outputs to obtain processed values;

storing the processed values;

determining new outputs depending on the processed values by placing a connection to processed values stored in the step of storing, the connection providing the processed values as an input to at least one adder; and reverse processing the processed values to obtain the previous outputs, the step of reverse processing further comprising supplying an output from the adder to at least one switch.

* * * * *